Feb. 12, 1957 — L. W. MUFFLEY — 2,780,910
WHEEL AND SHAFT ASSEMBLY
Filed July 14, 1953
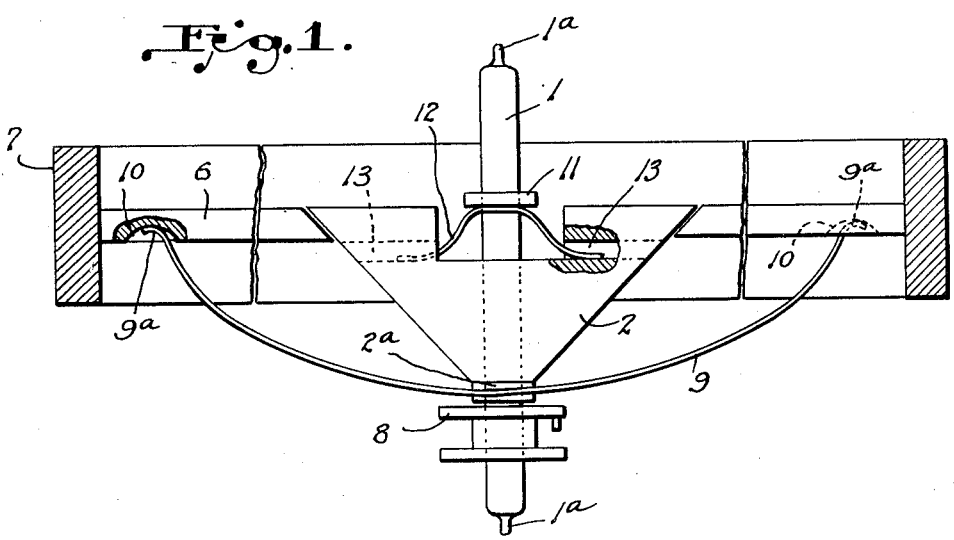
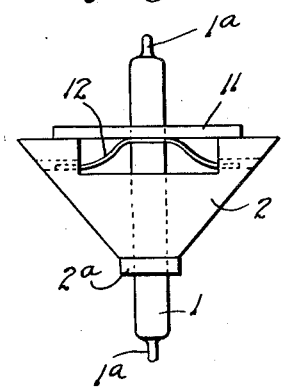 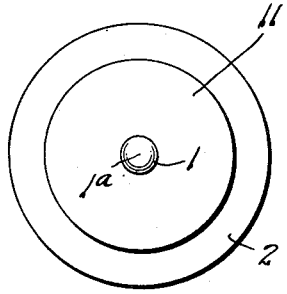 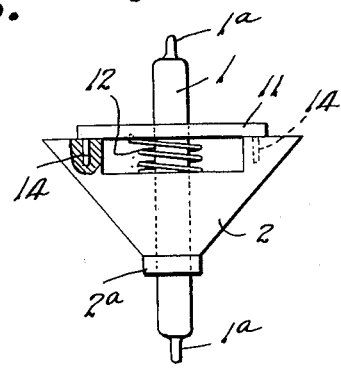
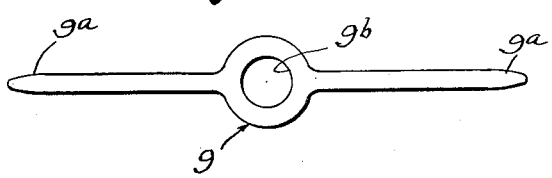
INVENTOR.
Leo W. Muffley
BY Chester L. Davis
ATTORNEY.

United States Patent Office 2,780,910
Patented Feb. 12, 1957

2,780,910

WHEEL AND SHAFT ASSEMBLY

Leo W. Muffley, Palmyra, Mo., assignor of one-third to Chester L. Davis, Perry, Mo.

Application July 14, 1953, Serial No. 367,945

3 Claims. (Cl. 58—107)

My invention relates to a new and improved wheel and shaft assembly and more especially to such a structure as is used in timing apparatus such as watches, wherein a relatively heavy balance wheel is supported on a staff.

An object of my invention is to provide an improved structure wherein the effects of shock are counteracted within the wheel and staff assembly without the shock being transmitted to the delicate end pivots or bearings supporting the staff.

This improved structure is related to my co-pending application Ser. No. 94,104, filed May 19, 1949, entitled Watch Balance and Staff, now Patent No. 2,648,188, in which is disclosed a balance wheel so mounted that it will move axially along the staff under conditions of shock and at the same time is prevented from independent rotation with respect to said staff. In the aforementioned application the balance wheel is normally seated against a collar, which collar being fixed on the staff does to some extent limit the effectiveness of the assembly to counteract shock perfectly in all possible directions in which the shock might be transmitted. The present application utilizes the principles set forth in the abovementioned application and in addition describes a structure that is effective in counteracting the effects of shock regardless of the direction of the shock transmitted.

A better understanding of my invention can be had from reference to the accompanying drawings wherein;

Fig. 1 shows a side view in partial section of a balance wheel and staff assembly, Fig. 2, Fig. 3 and Fig. 4 show certain modifications of an essential part of the structure embodied in my invention, and Fig. 5 shows a typical construction of a spring member employed to counteract shock in structure used in my invention.

To solve the problem of so mounting a wheel that all shock movements will be counteracted by means of a spring requires certain observance of basic principles. Other methods have been suggested such as employing a spiral arm for the balance wheel, the said arm itself being quite resilient. That method has one serious objection, namely, if the spiral arm is made sufficiently resilient to be effective for the purpose intended it is then too weak to properly support the balance wheel in poise. The disadvantages of other systems have been avoided in the improved structures shown and described in the other application Ser. No. 94,104 now Patent No. 2,648,188 and in the present application.

In the drawings, Fig. 1 shows in section a balance wheel 7 which has an arm 6, the said arm 6 being normally held against a collar 2 by means of spring 9, the ends 9a of spring 9 resting in grooves or indentations 10 located in the bottom of arm 6. The spring 9 is shown in more detail in Fig. 5 which is intended only to be schematic, the ends 9a being preformed and bent as desired, and the central portion of the spring 9 having an opening 9b annular in shape to be press-fitted against an extension collar 2a of collar 2 and held firmly thereto. The collar 2 in the present application is free to move axially in a vertical direction until it reaches a stop 11 positioned on the shaft but is prevented from moving in the opposite direction axially beyond the position of a second stop here represented as the roller-table 8. A second spring 12 is secured to stop 11 and to staff 1 so that it must at all times turn with it. The ends of spring 12 bear in guide holes 13 near the top of collar 2 and serve to lock the staff and collar 2 against independent rotation with respect to each other. Staff 1 has conventional end pivots 1a that are small as compared to the staff dimension proper.

It will be seen from an examination of Fig. 1 how it is that I provide for shock resisting from all directions. Should the direction of the shock against the balance wheel 7 come in a horizontal direction, the arm 6 will travel downward along the inclined face of the cone-shaped collar 2. Should the shock come from a vertical direction downward against the arm 6, the arm 6 would then travel downward and if the shock were exactly centered axially with staff 1 and equally distributed on both sides of arm 6, arm 6 would not touch the inclined surface of collar 2 on its downward movement. Should the direction of the shock wave be upward, against the upper pivot 1a of staff 1 it is exceedingly unlikely that it would be axially aligned with staff 1 and any unbalance of force of the shock wave on either side of arm 6 would cause one side of the arm to act as a fulcrum point to force the other side of the arm away from the surface of the collar 2 and move downward. Thus far in my description of my invention the operation and typical structure are quite similar to that disclosed in my prior application Ser. No. 94,104 now Patent No. 2,648,188.

We will now describe the operation of my invention under the possible circumstance that a shock wave is transmitted exactly in balance to the entire wheel 7 and the arm 6 thereof, so that the tendency of the heavy balance wheel 7 is to move exactly parallel to the axis of staff 1. Under such conditions a second spring 12 becomes effective, the center of which is affixed to stop 11 and staff 1 and the ends of which ride in guide holes 13. The entire assembly comprising balance wheel 7, arm 6, spring 9 and collar 2 would, under those conditions move upward until it reached the limit as shown in Fig. 2 and in Fig. 4, determined by the position of stop 11 and afterwards would return to the lower stop represented by roller-table 8. In Fig. 2 and Fig. 4 I show collar 2 as being at its uppermost position against stop 11 and when collar 2 is at rest and not in condition of shock it moves downward against a lower stop represented as roller-table 8 in Fig. 1.

It is very important at this point to call attention to the fact that the arrangement I show avoids the use of one spring tension balanced against the tension of a second spring, a feature not to be overlooked. For instance the use of a spiral arm made up of a spring member as shown in the prior art would be just that, the flexing of one spring producing a flexing of another spring or portions of the same spring in different directions. Here in the structure of my invention the flexing of spring 9 is produced when the tension of spring 12 is such that it is at rest, and as explained, when the spring 12 is flexed by shock movement the entire assembly including spring 9 merely moves as a unit.

As in my earlier application I show in Fig. 1 the use of springs bearing in grooves to prevent independent movement of the balance wheel 7 in a direction of rotation execpt as it rotates with staff 1 and roller-table 8.

Obviously collar 2 could be keyed on staff 1 to move only along the axis of staff 1 and not rotate therewith.

Fig. 2 shows a modification wherein the stop 11 is enlarged so that it bears against most of the upper surface of collar 2 when the collar 2 reaches the uppermost position, and Fig. 3 is a top plan view of such modification.

Fig. 4 shows the use of a helical spring 12 instead of using a leaf type spring as shown in Fig. 1, and in so doing unless some method of keying collar to the staff is used as suggested above, guide rods 14 working in guide holes must be used to prevent independent rotation. Here, as in Fig. 2, the assembly is in a condition of upward movement and when the shock wave has ceased the assembly would of course return to a position lower on the staff to such a stop as roller-table 3 shown in Fig. 1.

There are many refinements of the structure I show which may be incorporated in the practice of my invention without departing from the spirit thereof. For instance, the shape of collar 2 can take the form of a bowl or cup instead of that of a cone as shown, such being illustrated in my earlier filed application Ser. No. 94,104, and in so doing the more rapid seating of arm 6 against cone or collar 2 may be accomplished. The shape of the grooves 10 in arm 6 could be modified to definitely establish a dip or depression into which the ends of spring 9 would normally rest. In such an arrangement it would require as much flexing for one end of the spring to leave the detent as it would require for the other end of the spring, they both working against an inclined surface of the detent. I have shown in Fig. 4 the use of a helical spring and some means other than that of cooperating ends of a leaf spring seating in grooves in the arm for locking the arm to the staff to prevent independent movement. Obviously the use of guide pins and associated groove guideways could be used to substitute for the leaf spring and associated grooves in the arm 6 as I show in Fig. 1, the many modifications possible being too many to illustrate and maintain clarity of expression in the present application by explanation further in this specification. One important feature is present in this application and that is the use of separate springs to react against the force of shock waves coming from different directions and the fact that in the arrangement shown these springs are independent and no one works against the tension of the other. It is therefore to be strictly understood that the scope of my invention is to be limited only by the following claims.

I claim:

1. An improved wheel and staff assembly comprising in combination a staff, a wheel having an arm, said arm having a central opening through which said staff passes, said arm being free to move axially along said staff, an upper stop on said staff and a lower stop on said staff limiting the axial movement of said arm, a collar on said staff free to move axially along said staff between said stops, a spring between the upper stop and said collar normally forcing said collar toward said lower stop, and a second spring normally forcing said collar and said arm to contact each other.

2. An improved wheel and staff assembly comprising in combination a staff, a collar encircling said staff and free to move axially thereon, a wheel having an arm, said arm having a central opening through which said staff extends, an upper stop and a lower stop fastened on said staff, a spring coacting against said collar and said arm normally forcing the same in contact with each other, and a second spring coacting against said collar and one of said stops normally forcing the same away from each other.

3. An improved wheel and staff assembly comprising in combination a staff, a collar encircling said staff, a wheel having an arm, said arm having a central opening therein through which said staff extends, said arm being free to move axially along said staff, said collar being free to slide along said staff within certain defined limits, stops secured to said staff for defining said limits, a spring associated with said collar normally forcing the same toward one of said stops, and a second spring normally forcing said collar against said arm.

References Cited in the file of this patent

UNITED STATES PATENTS

| 380,769 | Rohde | Apr. 10, 1888 |
| 1,951,995 | Schaad | Mar. 20, 1934 |
| 2,648,188 | Muffley | Aug. 11, 1953 |

FOREIGN PATENTS

| 167,848 | Switzerland | June 1, 1934 |